Patented Dec. 16, 1930

1,785,415

UNITED STATES PATENT OFFICE

WALTER J. KLAIBER, OF PITTSBURGH, PENNSYLVANIA, ASSIGNOR TO THE KOPPERS COMPANY, A CORPORATION OF DELAWARE

REMOVAL OF CARBON BISULPHIDE FROM GAS

No Drawing.  Application filed April 22, 1927. Serial No. 185,927.

This invention relates to the removal of carbon bisulphide from gas, for example, fuel gas, such as coal gas, water gas or the like. My invention relates further to a process for treating gas with a solvent to remove carbon bisulphide therefrom and which may serve, also, to remove naphthalene or the like from the gas, and treating the solvent out of contact with the gas with an immiscible liquid for the removal of carbon bisulphide therefrom.

My invention thus has particular relation to processes for removing naphthalene and the like from fuel gas by means of a non-aqueous solvent and may advantageously be practiced in conjunction with such naphthalene removal processes.

An object of my invention is to provide a superior medium for extracting dissolved carbon bisulphide from a non-aqueous solvent previously used to remove carbon bisulphide as well as other impurities from gas.

My invention has for further objects such other operative advantages and results as may hereinafter be found to obtain.

The difficulty encountered in prior attempts to utilize non-aqueous solvents for removing carbon bisulphide from gas resides in the fact that alcoholic solutions which have been used to extract the carbon bisulphide from the non-aqueous solvent are somewhat soluble in such non-aqueous solvents, such, for example, as kerosene, gas oil, or other petroleum oil. Due to this fact, a certain amount of the relatively valuable alcoholic solution has been invariably lost by solution in the other solvent and evaporation therefrom into the gas being treated. Furthermore, such alcoholic solutions are somewhat miscible with solvents used for naphthalene removal and it has been difficult to obtain a thorough separation of even the undissolved alcohol from the naphthalene solvent.

I have discovered that aqueous solutions of alkaline sulphides or polysulphides when agitated with oils containing carbon bisulphide are capable of effectively removing the latter. The chemistry of this extraction has not been completely determined but probably involves the formation of alkaline thio-carbonates. For example, when sodium polysulphide solution is employed, the product of the reaction is probably sodium thio-carbonate ($Na_2CS_3$).

The solutions used for the extraction may be the sulphides or polysulphides of the alkali metals, such as sodium, potassium, and ammonium, or of the alkaline earth metals, such as calcium, magnesium, and the like, all of which I herein collectively designate as alkaline sulphides. Such solutions are immiscible with, and insoluble in, non-aqueous solvents used for the removal of naphthalene from gas and which have a certain solvent action on the carbon bisulphide in the gas. This property, in conjunction with their solvent action on carbon bisulphide dissolved in such non-aqueous solvent, renders such solutions improved media for removing carbon bisulphide from solvents used for treating gas.

I prefer to practice my invention in conjunction with a process for removing naphthalene from fuel gas, such as that described and claimed in the U. S. patent to Frederick W. Sperr, Jr., No. 1,578,687, dated March 30, 1926. The Sperr process consists briefly in subjecting the gas to contact with a large amount of a suitable solvent such as gas oil in recirculation for the removal of a part of the naphthalene and subsequently subjecting the thereby purified gas to the action of small amounts of fresh solvent, preferably introduced intermittently.

In thus treating gas, carbon bisulphide is also removed by the non-aqueous solvent until a condition of equilibrium is reached where said solvent is substantially saturated with respect to the carbon bisulphide in the gas. By continuously or intermittently extracting the carbon bisulphide from the non-aqueous solvent after contact with the gas, the non-aqueous solvent is maintained in an unsaturated condition with respect to the carbon bisulphide in the gas and serves as an extraction agent for removing carbon bisulphide from the gas, as well as any other substance, such as naphthalene, for the removal of which the non-aqueous solvent may also be intended.

For this extraction of carbon bisulphide from the solvent which has served to remove it from the gas, I employ an aqueous solution of an alkaline sulphide. One such solution that I have employed for this purpose with success consists of a 10% solution of sodium sulphide ($Na_2S$) in which sulphur is dissolved to form sodium polysulphide, the proportions being 32 parts of sulphur to 78 parts of $Na_2S$. This solution is agitated with the non-aqueous solvent so as to insure thorough and intimate contact therewith and effects substantially complete removal of the carbon bisulphide therefrom. The non-aqueous solvent is subsequently separated by decantation or otherwise for further treatment of the gas.

The apparatus used for the extraction of the carbon bisulphide and the treatment of the gas may be that commonly employed in the chemical arts for similar purposes and need not be described herein.

The extraction of carbon bisulphide from a non-aqueous solvent may be practiced either continuously or intermittently—that is, the solvent may be treated during recirculation or portions may be withdrawn from the solvent-recirculating system from time to time, treated for the removal of carbon bisulphide therefrom and returned to the recirculating system. Ordinarily, however, I prefer to conduct the extraction continuously in the path of, and during recirculation of, the solvent.

While I have described my invention with relation to a process for removing naphthalene from gas, it is not limited to practice in conjunction with such process, as the non-aqueous solvent may be employed for any other purpose or solely for the removal of carbon bisulphide when this is desired. I have found, however, that my invention provides a superior and economical method of removing carbon bisulphide from gas which is especially advantageously practiced in conjunction with the removal of naphthalene from the gas and in which loss of the extraction agent by solution in the non-aqueous solvent employed for initially removing the carbon bisulphide and naphthalene from the gas is substantially eliminated. This is accomplished without impairing the efficiency of naphthalene removal and without interfering in the operation of the primary system.

While I have described my invention with relation to a particular form and embodiment, it may be variously practiced and embodied within the scope of the following claims and while I have specified a preferred extraction medium, I do not limit my invention to such specific medium except insofar as I may limit it in the claims hereinafter made.

I claim as my invention:

1. In a process of removing both naphthalene and carbon bisulphide from flowing fuel gas containing them, the steps comprising recirculating in the path of the gas an oil having solvent properties with respect to both naphthalene and carbon bisulphide, withdrawing portions of the solvent oil to reduce the amount of naphthalene contained in the recirculated body of solvent oil, adding relatively fresh solvent oil to maintain the solvent at a substantial degree of purity, and treating the recirculating solvent oil with an aqueous alkaline sulphide solution to remove carbon bisulphide therefrom and thus maintain in the solvent oil a substantial capacity for absorbing carbon bisulphide from the gas.

2. The process of removing both naphthalene and carbon bisulphide from flowing fuel gas containing them, which comprises recirculating in the path of the gas a solvent oil which will absorb naphthalene and carbon bisulphide, treating said recirculated oil with an aqueous alkaline sulphide solution to remove carbon bisulphide therefrom and thus maintain in said recirculated solvent a substantial capacity for absorbing carbon bisulphide from the gas, withdrawing portions of the recirculated solvent oil to reduce the amount of naphthalene contained in the recirculated body of solvent oil, subsequently treating the gas with fresh solvent oil to effect a further removal of naphthalene and permitting the said subsequently added solvent oil to mingle with and refresh said recirculated solvent oil.

In testimony whereof, I have hereunto subscribed my name this 20th day of April, 1927.

WALTER J. KLAIBER.